(12) United States Patent
Newlin

(10) Patent No.: US 8,682,878 B2
(45) Date of Patent: *Mar. 25, 2014

(54) SYSTEMS AND METHODS FOR GATHERING AND/OR PRESENTING INFORMATION

(75) Inventor: Nicholas C. C. Newlin, Washington, DC (US)

(73) Assignee: Braintree Solution Consulting, Inc., Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/472,327

(22) Filed: May 15, 2012

(65) Prior Publication Data

US 2012/0226694 A1 Sep. 6, 2012

Related U.S. Application Data

(63) Continuation of application No. 11/286,370, filed on Nov. 25, 2005, now Pat. No. 8,180,749.

(60) Provisional application No. 60/630,303, filed on Nov. 24, 2004.

(51) Int. Cl.
*G06F 7/00* (2006.01)

(52) U.S. Cl.
USPC .......... 707/705; 707/722; 707/737; 709/223; 715/200

(58) Field of Classification Search
USPC .......... 707/999.001, 705, 722, 737; 709/223; 715/200
See application file for complete search history.

(56) References Cited

U.S. PATENT DOCUMENTS

| | | | | |
|---|---|---|---|---|
| 6,363,421 | B2* | 3/2002 | Barker et al. | 709/223 |
| 6,636,893 | B1* | 10/2003 | Fong | 709/223 |
| 7,225,183 | B2* | 5/2007 | Gardner | 707/999.01 |
| 2002/0049750 | A1* | 4/2002 | Venkatram | 707/3 |
| 2004/0064433 | A1* | 4/2004 | Thier et al. | 707/1 |
| 2005/0154701 | A1* | 7/2005 | Parunak et al. | 707/1 |
| 2005/0283494 | A1* | 12/2005 | Colossi et al. | 707/102 |

* cited by examiner

*Primary Examiner* — Hosain Alam
*Assistant Examiner* — Jieying Tang
(74) *Attorney, Agent, or Firm* — Moazzam & Associates, LLC

(57) ABSTRACT

The present invention provides systems and methods for presenting a quantity of information in a single tool. Such a tool includes a map of various objects, the objects having themes relating to a given overall concept, wherein at least one object contains information relating to other objects that have a relationship with that object.

20 Claims, 10 Drawing Sheets

SYSTEMS AND METHODS FOR GATHERING AND/OR PRESENTING INFORMATION

This application is a continuation of U.S. patent application Ser. No. 11/286,370, filed Nov. 25, 2005, now U.S. Pat. No. 8,180,749; which claims priority to U.S. Provisional Patent Application Ser. No. 60/630,303, filed Nov. 24, 2004, the contents of which are hereby incorporated by reference herein in their entirety into this disclosure.

BACKGROUND OF THE INVENTION

1. Field of the Invention

The present invention relates to information management. More particularly, the present invention relates to systems and methods for gathering, analyzing and managing information from various sources and presenting the culmination in a single source.

2. Background of the Invention

The development of the Internet and the proliferation of technology have heightened awareness of the magnitude of information that is available. Such information is often critical for individuals, companies and organizations in determining future actions as a result of considering prior goals or achievements. Further, such information may be attained and presented through various tools. A significant obstacle in conventional information management is presenting all relevant information within a single tool.

Conventionally, various tools for presenting information have been used. Of such tools, four popular examples include flow charts, databases and software applications, web navigation and neural networks. Each such example has certain advantages and disadvantages. For example, there is an overload of information in traditional databases. There are too many pages to consider in web navigation. Most flow charts are "soft" relational rather than fully representative of the way systems work and are populated by tangible resources and populations of end-users. Neural networks are limited to "cause and effect"—conditional algorithms that do not capture the dynamic flow of an entire system or industry. Above all, these approaches can rarely simultaneously capture the "who" and "where" and "how" of most systems—a failure to connect resources, populations and functions in real time and based on real facts. What is needed is to solve the problem of providing an intuitive flow for dynamic information that is not only complex but changing/updating through time.

Thus, a need exists in the art to provide a tool that has the ability to capture information from various sources and present the information through a single tool by presenting the relationship between the sources and the impact of such sources upon other sources.

SUMMARY OF THE INVENTION

This present invention provides, among other advantages, stakeholders in various fields with a tool for managing entire systems, industries, institutions and enterprises, regardless of their simplicity or complexity. The invention represents a single integrated picture of how the system works, managing critical information and data regarding who contributes to it, who is effected by it, what is produced or provided, where resources are accessed and how the system stakeholders can coordinate and collaborate to ensure that all components are integrated, sustainable, appropriate, effective and efficient.

Fields and industries suitable for the application of the invention are virtually unlimited. Examples include, but are not limited to: health care, investment banking, child and youth development, facility monitoring systems, workforce development, public safety, criminal justice, economic development, education, government, enterprise management, manufacturing, tourism and entertainment, political campaign management, military operations, homeland security, national defense and intelligence, among others. This tool would be helpful to any organization or in any situation where information or data is to be considered from various sources and relationships drawn to determine how a system or method functions or is maintained.

In one exemplary embodiment, the present invention provides stakeholders with a critical tool for achieving a more complete understanding of the existing services and resource delivery within and across systems. It is defined by the experience of the system contributors and end clients, representing a potentially unifying expression of how stakeholders can coordinate and collaborate to provide integrated, sustainable, appropriate, effective and efficient service delivery—the ultimate goal of any system. The present invention is also designed to enable continuous updating of changes in system structure, resources, information and status.

The present invention has numerous advantages that are defined by the functions in its architecture. Exemplary functions that provide competitive advantages include, but are not limited to: defines the roles, responsibilities and resources of all major partners and collaborators; provides an elegant and comprehensive documentation of how a system works; develops a clear view of a system that is relevant and useful to all stakeholders; and provides a tool that is updateable and easily altered with changes in the system, its structure and resources.

Many goals may be achieved by use of tools according to the present invention. Such goals include, but are not limited to: a clear articulation of the relationship between global, national, regional, state and/or local resources; improved overall understanding of how a service system impacts end-users; yield greater efficiency and effectiveness of programmatic, financial, information and knowledge management efforts; and empower stakeholders to develop plans for leveraging public and private resources.

In one particular exemplary embodiment, the present invention can include an articulation of funding streams, the methods of service delivery, and the types of populations served by different service providers. This process also begins to establish a common language for stakeholders to use in describing the system profiled—often a challenge when conducting any form of strategic planning or program coordination. Many fields cover a broad array of issues and play host to a diverse variety of stakeholders: administrators, service providers, social workers, public health professionals, nurses, practitioners, evaluators, budget officers, legislators, politicians, regulators, etc. Establishing a common frame of reference, easily understandable and accurately reflective of how a system of service delivery works is a challenging but necessary endeavor for creating lasting and meaningful improvement to the management and sustainability of an effective system. The present invention provides an opportunity for both immediate and long-term benefits by providing this comprehensive frame of reference.

The process of developing a tool according to the present invention involves research, interviews, periodic consultations, site visits, and collaborative sessions all geared toward mapping a given system or industry, its programmatic and institutional resources, as well as collaborative processes such as planning groups and committees that involve multiple partners. Hence, the present invention represents a new and potentially significant contribution to improving and coordinating resources.

In another exemplary embodiment, the present invention focuses on the tangible existing resources in a service delivery system and sets out to identify and analyze the program type, population served, programmatic capacity, access points, funding and revenue sources, and any other variable requested by the client and its partners. The exemplary tool, which may be on one or multiple servers, and linkable to numerous databases in real time, gathers together detailed information to create a more unified and comprehensive system, while simultaneously producing information that can be disseminated to all stakeholders in the field.

Tools according to the present invention can assist in identifying the gaps in needs and services but just as importantly, they can facilitate greater programmatic communication between organizations that share a desire for profiting, predicting and/or improving conditions in the field, industry or institution. By identifying resources and performing the system analyses, such tools also enhance the process of building capacity for planners, managers, evaluators and service providers, making "the whole greater than the sum of the parts." Among the functions of an exemplary tool are, but are not limited to: documentation of collaborative processes and planning groups; detailed program information, including capacity (number served) and funding streams and financial resources for sustainability; identification of challenges and opportunities to build additional service-based partnerships; and articulation of best-practices models for inclusion in strategic planning and management decisions.

DETAILED DESCRIPTION OF THE INVENTION

The present invention provides a tool for gathering and managing a large quantity of data and presenting it from a systemic point of view on a single page or portal in a highly condensed form. The invention utilizes codes and symbols to allow for the interdependent functioning of resources, end-users, geographic areas, financial information, and institutions to be captured, managed, manipulated and evaluated. Each industry or field of endeavor can be viewed as a system, whether it be health care, the airline industry, investment banking, government, public safety, child and youth development, economic development, or military/intelligence operations. Each system is made up of distinct functionalities, institutional resources, populations affected or served, methods, outcomes, financial information, capacities, capabilities, interdependent relationships, or the like. The present invention brings the relevant elements together in a way that allows for a single integrated picture of the system to then guide all management issues. In other words, such a tool according to the present invention is used to manage the entire system, institution or enterprise, rather than simply one piece of it.

The present invention shows relational pathways in service delivery and function across multiple organizations and programs. It is defined by the experience of the system contributors and end clients and is therefore the unifying expression of all functions, resources and interdependencies. It reveals and provides a means for how partners can coordinate and collaborate to provide seamless service delivery.

Figure 1:
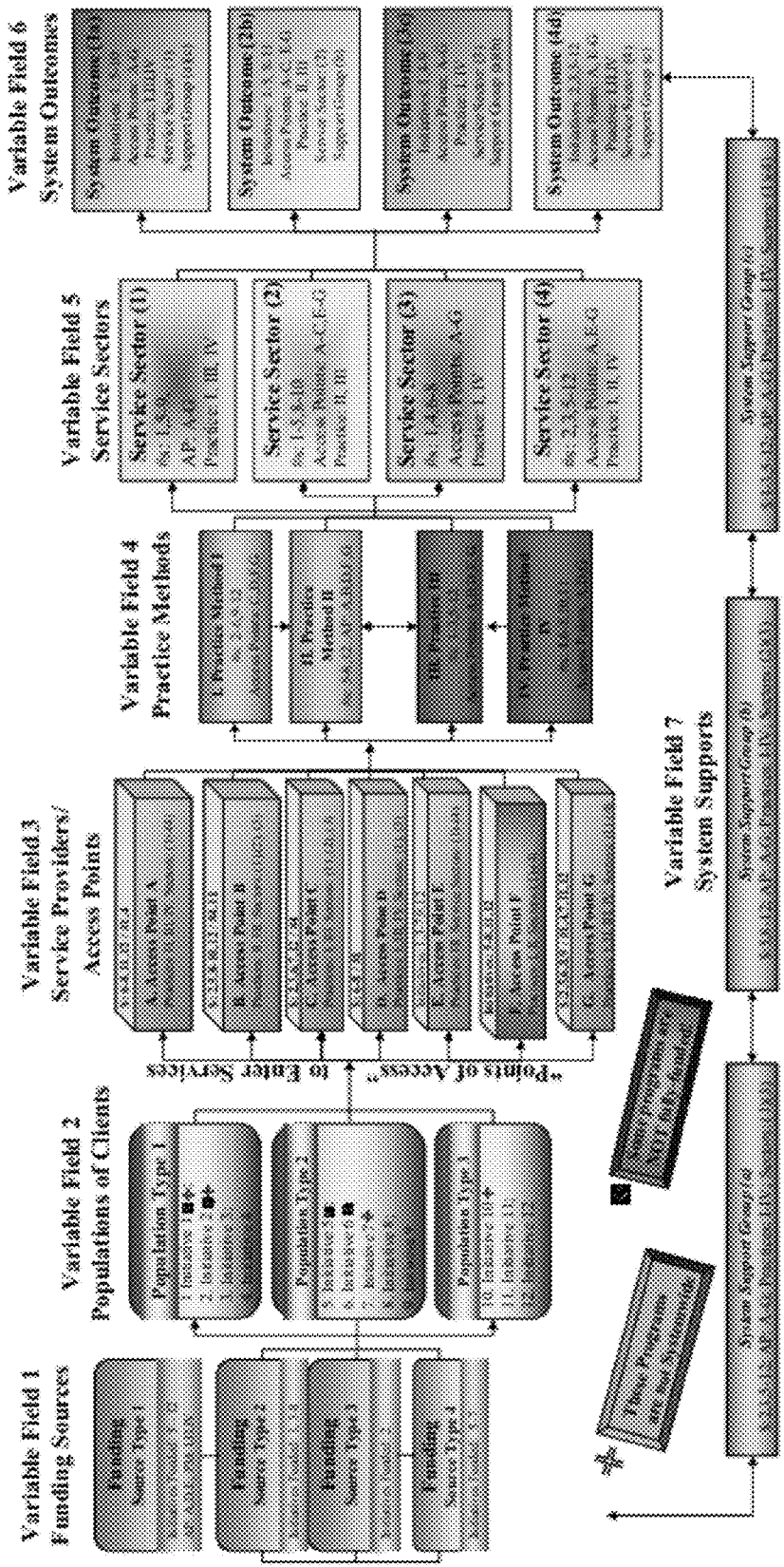
FIG. 1 shows a generic system map according to the present invention.

In the non-limiting example shown in FIG. 1, the invention is revealed in one of its many exemplary embodiments, presenting a generic perspective of the ways in which information in a system, institution, industry or enterprise can flow. This example includes various major components, including Variable Field 1—funding sources (the different types of funds driving the development and delivery of products and services in a system), Variable Field 2—the population of, and types of clients served (who benefits or receives the goods and services provided/who enters system/what funds follow or are invested in them), Variable Field 3—the physical and virtual access points where services are delivered and/or developed (where and how clients/partners/institutions can access services), Variable Group 4—practice methods of service delivery (connoting how, where and/or when a service is provided), Variable Group 5—the service sectors of the system, industry or enterprise (here connoting what and how clients and partners receive services and from whom) and Variable Group 6—the system outcomes desired and/or monitored (the result of efforts/the status of performance/the variables that contribute to outcomes). This figure is non-limiting and the variables and labels used within each variable is merely presented to show an example of how the invention may be used to gather and present large amounts of information in a single comprehensive tool. The below description presents the process used to develop a system map similar to the exemplary map shown in FIG. 1.

In certain exemplary embodiments, the present invention begins by documenting resources, populations, methods, outcomes and tracking data streams. At an early stage, this process focuses primarily on the documentation of resources in a broad sense, not an inventory of all service providers across the targeted geographic area (a city, state, or nation, for example), but a significant number of which operate locally or regionally. The mapping of resources moves forward to anticipate the collection of information in a detailed way that permits aggregation to the level of whatever greatest geographic or other boundary is set by the clients and their partners. The consideration here is to build a capacity within organizations to be able to standardize the means by which they gather and communicate information and therefore develop an infrastructure for convening planning and evaluation across the targeted geographic area during the years following the initial population of the data managed by the invention.

Using code groups and symbols, the invention is able to both separate and aggregate information regarding the key functions and components of a system. For example, one code group, designated by Arabic numerals, may be assigned to information objects that possess a core function, such as a funding stream. A second code group, designated by capital letters in alphabetic order, may be assigned to institutions providing services. A third code group, designated by roman numerals, may be assigned to a family of classifications listing the practices of the industry. A fourth code group, designated by Arabic numerals enclosed in parenthesis [for example: (1)(2), (3)] is used to code the various service sectors that may be the target or originating point for another object's relation to the service sector. A fifth code group, designated by a combination of Arabic numerals with lower case letters enclosed in parenthesis [for example: (1a)(2b)] provides a means to encode system outcomes in this example. A sixth code group, using enclosed lower case letters [for example: (a)(b)] is used to create an association for system support groups of practices and stakeholders. These could be comprised of partner entities, clients, practitioners, or any other collaborative or distinct means for the larger system or entity to be supported, evaluated, assessed, etc.

Each of the code groups is associated with its respective designation. The designated variables above are grouped (vertically, horizontally, or otherwise) with their like variables, providing clear differentiation of the functional component each represents within the system. In addition, since each distinct member of a variable group is placed within a box or other graphic that separates the member from the rest of the members within its variable group, this allows for the inclusion of the applicable code groups to be represented within the box and, therefore, link the variable groups together in a way that aggregates sub-system information into the whole of the system.

In a given system map, such as the exemplary map shown in FIG. 1, various symbols may be used to enhance or supplement the information given. For example, the * and + symbols connote that resources were not fully funded or operated system wide, respectively. Here the example of a qualifier is to note valuation of financial information and geographic area of impact. The present invention may be used for virtually any type of qualifier—populations served, services offered, evaluations performed, practices and methods incorporated, etc. A key to the tool is the identification of the variable groups and the assignment of corresponding code groups and symbols that allow for a condensed communication of the flow between and among them.

In an example of how a tool may be constructed, from FIG. 1, four boxes are drawn denoting each of the four types within Variable Field 1—funding sources (code group One above). Within each box of funding source types are listed specific funding streams, each with an Arabic numeral assigned, that designate the "initiatives funded"—a relation to the items within Variable Field 2—from each particular source. The first box is entitled "Funding Source Type 1" and contains eight distinct Initiatives funded (Initiatives 5-12). The second box, located underneath the first, is entitled "Funding Source Type 2" and has seven distinct funding streams to Initiatives 1,3, 4, 5, 6, 7, and 8 (1,3-8). The third box is entitled "Funding Source Type 3" and has one funding stream to an Initiative listed (2). The fourth box is entitled "Funding Source Type 4" and has three funding streams to the Initiatives listed (5, 6, 7 or 5-7).

Figure 2:
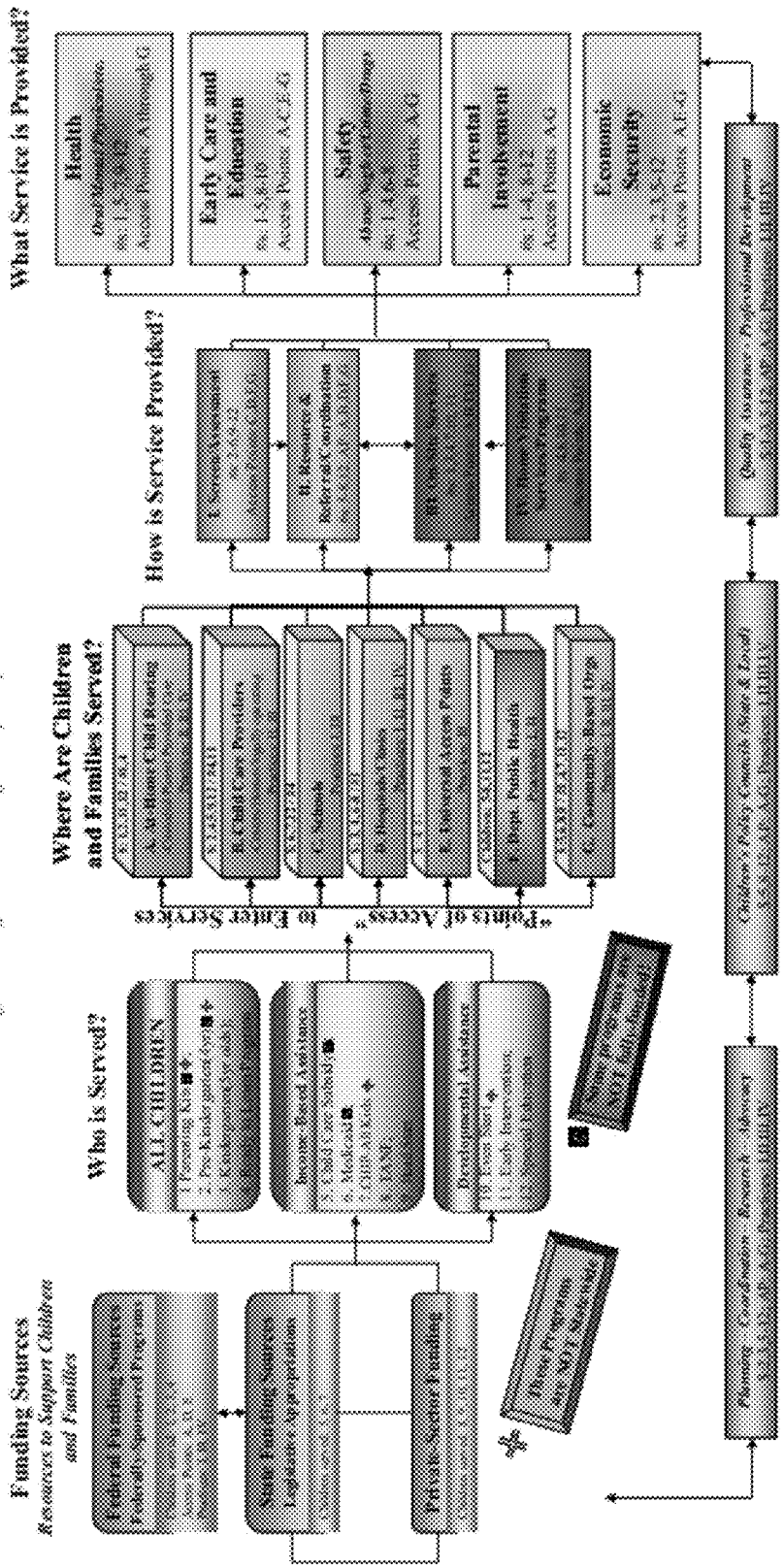
FIG. 2 shows a map for the system of early childhood in a state according to an exemplary embodiment of the present invention.

However, in this example, the origin of the association for the objects within Variable Field 1 is found in the objects within Variable Field 2—the Initiatives. In other words, the funding sources, and the funds specifically provided to the system in question, are organized by their relation to the objects of their investment. In this example, the term "Initiatives" is used. In FIG. 2, as a differentiating example, the term "Children Served" is used since it is a child development system being profiled. Returning to FIG. 1, Variable Field 2 is meant to allow for the aggregation and differentiation of various populations of clients. The first box within Variable Group 2, marked as "Population Type 1" has Arabic numerals 1, 2, 3 and 4—one for each of the "Initiatives" affecting Population Type 1. The second box has Arabic numerals 5, 6, 7, 8 and 9—again for each of the Initiatives affecting, in this case, Population Type 2. The third box, Population Type 3 has Arabic numerals 10, 11 and 12—one for each of the three distinct Initiatives affecting Population Type 3.

In FIG. 1, therefore, Variable Group 1, connoting sources of funding, is directly associated with Variable Group 2, the Initiatives funded that affect distinct types of populations of clients. The reason for this association is born from the fact that the Initiatives, which may include but not be limited to services, products, programs, eligibility-based benefits, and population-defined experiences, among others, would be funded from some specific source or sources. These Funding Sources might include, but not be limited to, federal or state monies, private sector investments, revenue-generating functions within an Initiative, donations, third-party contributions, and others. One of the challenges in managing any system is keeping track of funds, their sources, and their destinations. A similar challenge exists when considering populations affected by a system, institution, enterprise or industry. Within these first two Variable Fields, therefore, the invention has already paired issues affecting funds and populations through the connection made through the Initiatives they fund or receive.

In an automated system, such as a database using the invention as its portal or navigation tool, a user of the invention will be able to receive, at the click of a button or mouse, updated information on the aggregate Initiatives targeting a given population, for example "Population Type 3", and be able to view the net financial investment or funds flowing to that population as well as a breakdown of those funds by each distinct Initiative. In FIG. 1, Population Type 3 has three Initiatives—10, 11, and 12—and these Initiatives have their respective funding source, in this case—only Funding Source Type 1. Whereas the Initiatives within Population Type 1 and 2 have multiple funding sources, which therefore overlap in their contribution to the Initiatives conducted, Population Type 3 has only Funding Source Type 1 for its support. This therefore immediately places meaning in the context of Population Type 3—namely, that any changes to Funding Source Type 1 will have similar changes to the Initiatives affecting Population Type 3. Likewise, changes in Population 3, the total number of people, institutions or Clients in this population, or their level of demand for the Initiatives 10-12, has a corresponding impact on Funding Source Type 1. Namely, the supply, capacity and/or scope of Initiatives 10-12. This reveals a key aspect of one of the many applications of this invention, namely, that it simultaneously quantifies supply and demand relationships.

A third "variable field" is made up of institutional resources and organizations providing services. There are seven boxes listed vertically, each with the generic label "Access Point" used to provide, in actual usage, the name of the organizational type that is classified. Using the "code group two" from above—capital letters—the first organizational type or Access Point is given the letter "A" as its distinction. The second organizational type is given the letter "B" and so on through all seven—A, B, C, D, E, F and G.

A fourth variable field is identified as a distinct set of methods and practices particular to the industry/field mapped by the invention. In this example there are four boxes, each containing the connotation "Practice Method"—a brief title of a practice—and each practice is marked using the third code group listed above—Roman Numerals. The first box identifies a practice and gives it the number "I". A second practice is listed below in its own box and provided the number "II". In total, there are four boxes—I, II, III, and IV.

Each box identified in a given variable group on the page has space within it to allow for the numbers and letters of the other variable groups to be included in the box. In variable group one, the funding sources, each box (here containing Arabic numerals) can also contain the capital letters that mark the third variable group (institutional resources) as well as the Roman numerals of the fourth variable group (Industry Practices) on its own listing. Taking the first box of variable group one—"Funding source type 1"—the capital letters are listed: A, D, and E. This means that these funding sources are being allocated to the institutional types listed in the third variable group—the Access Points or "AP"—that have the connotation A, D and E.

Following on these capital letters are the Roman numerals I, II and IV. This connotes that the funding listed is supporting the "industry practices/methods" of variable group four—I, II and IV. Taken together, a large amount of information has quickly been condensed. A user viewing this first box will be able to follow the funds of Source Type 1 to the institutions and the practices they support.

In variable field three—the Access Points/institutional resources—each of the boxes uses a capital letter marking the different types of access points and/or institutions particular to the system profiled by the invention (the capital letters provide a second code group). Each "institutional resource type"—marked by a capital letter—has its own box in which space is made available for containing the Arabic numerals connected to variable field one—the funding sources—as well as the Roman numerals from variable field four—the industry practices/methods—and the Service Sectors of Field 5. For example, Access Point B, the second listed, contains the Arabic numerals \$2, 5, 8, 9, 10 and 12 prior to a forward "/" and #4, 11 after the "/". This signifies that the types of Access Points (virtual or physical organizations) classified as being of institutional type B are receiving funds from initiatives 2, 5, 8, 9, 10 and 12. However, since some initiatives will provide their services via an Access Point without providing funds directly to that Access Point, the second category in this case was created, namely, that Access Point B also provides access to the resources of Initiatives 4 and 11. This is highlighted in FIG. 3, as it expands upon the "Where are Children and Families Served" section of FIG. 2 (see below for additional description). Returning to FIG. 1, the Funding Sources supporting Access Point B are therefore related to the first group of initiatives identified, those before the forward slash "/"—2, 5, 8, 9, 10 and 12.

From referring to Variable Field 1 it is clear that Initiative 2 is funded entirely by Funding Source Type 3; Initiative 5 is funded by Funding Source Types 1, 2 and 4; Initiative 8 is funded by Funding Source Types 1 and 2; and Initiatives 9, 10 and 12 are funded entirely by Funding Source Type 1. Specific to Box B in FIG. 1, those Initiatives noted after the forward slash—4 and 11—are, for the purposes of this example, considered to be Initiatives that Population Types 1 and 3 are able to access at Access Point B but that Access Point B, and all institutions or actors in this classification, are not necessarily receiving funds from the Funding Source Types 2 and 1, respectively, for their administration/implementation. Taken further, this also means that other Access Points receiving funding to support Initiatives 4 and 11 must be the provider of services at Access Point B. As such, Access Point B acts as simply an Access Point and not the sponsor of Initiatives 4 and 11, which are implemented by those Access Points actually receiving funding to provide those services. In this case, Initiative 4 is implemented by Access Point E since it is the only Access Point that designates 4 as one of its directly funded Initiatives. Initiative 11, however, has two Access Points—A and F—providing the implementation of Initiative 11. Therefore, institutions in Access Point B may (or may not in any formal sense) operate in partnership with institutions in Access Points A and F but Access Point B institutions receive no funding specific to Initiative 11 from them. In addition, within the same box "B" there are listed Roman numerals II and III. This means that the organizational types classified as being type B are providing the methods and practices of type II and III as identified in variable field four—"industry practices." A user viewing this box will be able to quickly determine which of the funding streams are supporting the work of the institution and which industry practices and methods the institutional type identified is implementing.

In variable field four—the Industry Practices and Methods—each of the boxes uses a Roman numeral marking the different types of practices and methods particular to the system profiled by the invention (a third code group). Each is listed separately in its own box. There are four listed in FIG. 1—I, II, III and IV. Within box III, for example, the name of the Industry Practice is joined by Arabic numerals 1, 2, 3, 5, 6, 7, 8, 9, 10, 11 and 12 (#s: 1-3,5-12). This connotes that Industry Practice type III is supported by funding from Source Type 1 (5-12), Source Type (1, 3, 5-8) and Source Type 4 (5-7)—as listed in variable field one (funding sources). Also in box III are the capital letters A, C, D, E and G. This connotes that of the institutional resource types listed in variable group three, only A, C, D and G contain institutions and resources implementing industry practice III. A user viewing this box will quickly be able to determine what funding is supporting what industry practice and what access points are doing the implementation.

In variable field five—Service Sectors—the types of products, services and other system outputs can be aggregated and revealed in context with those variable fields described above. In FIG. 1, a fourth code group is established within variable field five by placing parenthesis around an Arabic numeral. Service Sector (1) for example, uses the code group to enable cross reference to other variable fields as desired. In Service Sector (1), the Initiatives 1, 5, 6, 7, 8 and 9 (#s: 1,5-9) are listed to connote which Initiatives and funding streams apply to this particular service sector. This helps identify the supply of services and organizes various services by themes or classifications, set by Service Sector (1). Viewing this information from the perspective of demand, the Service Sector also reveals what resources are being provided to or accessed by the population types in variable field two. In the example of Service Sector 1, Population Type 1 is receiving these services (through the means of Initiative 1), and Population Type 2 is accessing these resources through the means of Initiatives 5 through 9. Since none of the Initiatives targeting Population Type 3 are included in the inventory of Initiatives and populations, it is established that no one from Population Type 3 is directly affected by the resources classified as Service Sector (1). As with the boxes of other variable fields, Service Sector (1) also notes the Access Points (AP: A-G) serving as the vehicles for the delivery of service sector (1), and also connotes the Practice Methods Service Sector (1) implements—namely I, III, and IV.

In variable field six—System Outcomes in the example of FIG. 1—the vertical alignment of discrete system outcomes is depicted. As with the other variable fields, depending on the intended use and application of the invention, this variable field may be used to articulate broad system, institution and/or enterprise accomplishments, benchmarks and measurable progress or indicators made through the efforts of all other variable fields. In FIG. 1 this variable field has four System Outcomes each denoted by a fifth code group—an Arabic numeral and lower case letter together enclosed by parenthesis. For example, the first System Outcome listed, is identified as "System Outcome (1a)." Contained within the box of System Outcome (1a) are listed: Initiatives 1,5,6,7,8,9 and 10; Access Points: A,B,C,D,E,F,G; Practice Methods I,III,IV; Service Sector (1); and Support Group (a) and (c). Since Systemic outcomes are often value-based, the invention allows for a ready alignment of the variables within a system by the values established by stakeholders for measuring effectiveness and other assessments.

In variable field seven—System Supports—in FIG. 1 opportunity can be provided for the secondary services and resources that ensure an effective and appropriate system to be noted along with those variable fields and objects which they support. In the non-limiting example of FIG. 1, a sixth code group is established for variable field seven—the use of a lower case letter enclosed in parenthesis [for example: System Support Group (b)]. In the box for System Support Group (a), the funding sources and Initiatives of Arabic numerals 2, 3, 5, 6, 7, 8, 9, 10, 11, and 12 are noted. This signifies that Support Group (a) may receive funding through the Initiatives, that Support Group (a) may control or manage these Initiatives through collaboration, and/or that System Support Group (a) conducts evaluations or strategic planning activities related to these Initiatives, among other possibilities. In addition, this example shows that this group (a) applies itself to Access Points A,B,C,D,E,F and G as well as Practice Methods I, II, III, and IV, and Service Sectors (1) and (3). These variables quantify the system behind a system—the efforts that bring collaborating partners together, provide professional development opportunities, evaluate and assess Initiatives, Access Points, Service Sectors, System Outcomes, Practice Methods, and Funding Sources; ensure sustainable or adequate funding for the system, industry, institution or enterprise; and in other ways support the population-based services of the system.

In combination with spreadsheets, databases, web-enabled information, web-enabled portals, raw reports and other information, users can easily move through these materials to find the specific numbers—financial information, institutional capacity, number served, populations affected, etc.—that they need in order to make an informed decision or gain understanding of how the sub-systems and components of the larger system operate. As symbols and other distinct markers are used to identify different variable groups—that can be expanded or contracted based on the industry, how it functions, and the desired ends of the application of the invention—a dual phenomena is enabled. First, the functions of the entire system can be viewed and analyzed from a very broad and comprehensive standpoint. Second, that highly detailed and narrow queries can be pursued that track individual items of each of the variable groups listed.

In FIG. 2, for example, Medicaid, which is in the "Who is Served? Variable field as number 6 within the population type of "income-based assistance," is traced to funding source type 6, listed within the "Federal Funding" box, the "State General Fund" box and the "Private Sector Funding" boxes within the Funding Sources variable field. Through the structure provided by the invention, and the code group, Medicaid can be followed and tracked across the other variable groups, allowing a picture to emerge of what organizational types the funding is flowing to (for example, institutional types A, C, D, F and G), what industry practices it supports (for example, I and II), and then to other variable groups that could denote populations affected, outcomes, geographic regions, service types, and many others. The application of the present invention is virtually unlimited. One of its great strengths is in condensing a great amount of information and enabling a graphic depiction of how a given industry, field, institution, enterprise, phenomenon, geographic area and/or system operates.

As noted above with respect to FIG. 1, various themes and boxes, variables and systems may be considered using the teachings of the present invention. For each such system or organization or architecture, the individual components would necessarily be dependent on the specific topic being considered. Thus, the tool shown in FIG. 2 is merely exemplary of a hypothetical situation where users are interested in studying the relationship of various factors that contribute to a System for Early Childhood Development. However, what may be gleaned from this example is how the various boxes are drawn out to contribute to a given study of this hypothetical system.

As already discussed, the themes and resources of each mapped system are different. The themes of a given mapped system and their associated resource maps are customized organizing categories for all services and programs related to the field (for example: Child Development, supply chain management, Chronic Disease, Health Care, military operations, investment banking, etc.) and within the targeted area of geographic focus (for example, a state, city, region or country). The themes and their related subtopics enable a thorough mapping of resources that can clarify the role and function each plays in their area of impact—be it defined by geography, industry, topic, or population. The headers of these themes and their subtopics vary by industry, by field, by geographic area, and by client. The language proposed to describe the Service Delivery Themes is therefore highly customized for each client application and can be amended or completely discarded based on the feedback from stakeholders as to what would be the most appropriate language for defining the services in their field and within their geographic area of impact.

The present invention begins by documenting resources and tracking data streams. At an early stage, this process focuses primarily on the documentation of resources in a broad sense, not an inventory of all service providers across the targeted geographic area (a city, state, or nation, for example), but a significant number of which operate locally or regionally. The mapping of resources moves forward to anticipate the collection of information in a detailed way that permits aggregation to the level of whatever greatest geographic or other boundary is set by the clients and their partners. The consideration here is to build a capacity within organizations to be able to standardize the means by which they gather and communicate information and therefore develop an infrastructure for convening planning and evaluation across the targeted geographic area during the years following the initial population of the data managed by the invention.

Figure 3:
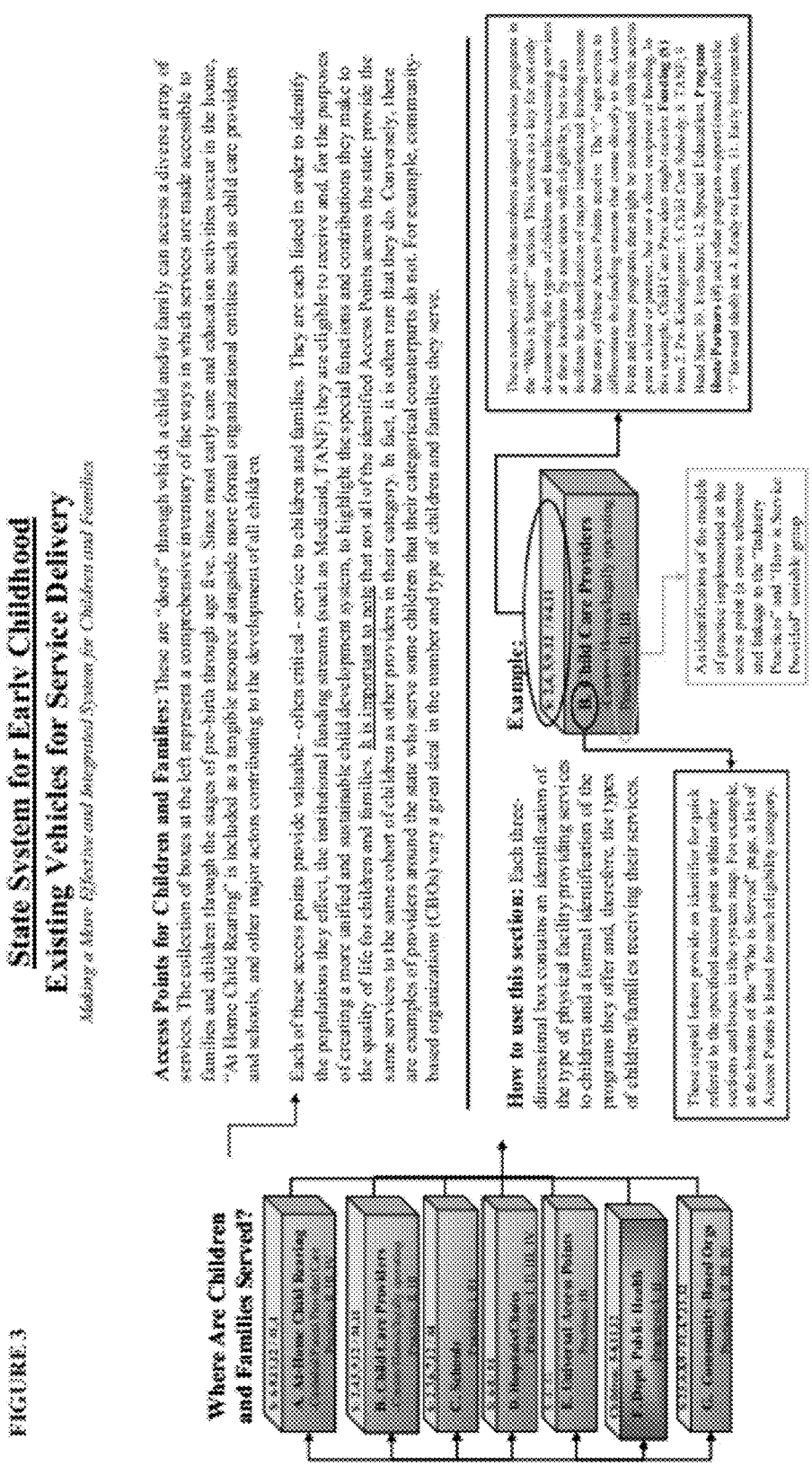
FIG. 3 provides a close-up examination and articulation of the functioning of objects within the invention—as an extension of the example provided in FIG. 2.

As FIGS. 2 and 3 further reveal, through the use of code groups and symbols the invention is able to both separate and aggregate information regarding the key functions and components of a system. As this example for and child development system describes, one code group, designated by Arabic numerals, may be assigned to information objects that possess a core function, such as a funding stream. A second code group used in this example, designated by capital letters in alphabetic order, may be assigned to institutions providing services. A third code group, designated by roman numerals, may be assigned to a family of classifications listing the practices of the industry. As seen in FIG. 1, multiple, virtually endless combinations of code groups are possible. It is essential however, that each of the code groups is associated with a respective designation. The designated variables are grouped (vertically, horizontally, or otherwise) with their like variables, providing clear differentiation of the functional component each represents within the system. In addition, since each distinct member of a variable group is placed within a box or other graphic that separates the member from the rest of the members within its variable group. This allows for the inclusion of the applicable code groups to be represented within the box and, therefore, link the variable groups together in a way that aggregates sub-system information into the whole of the system.

Figure 6:
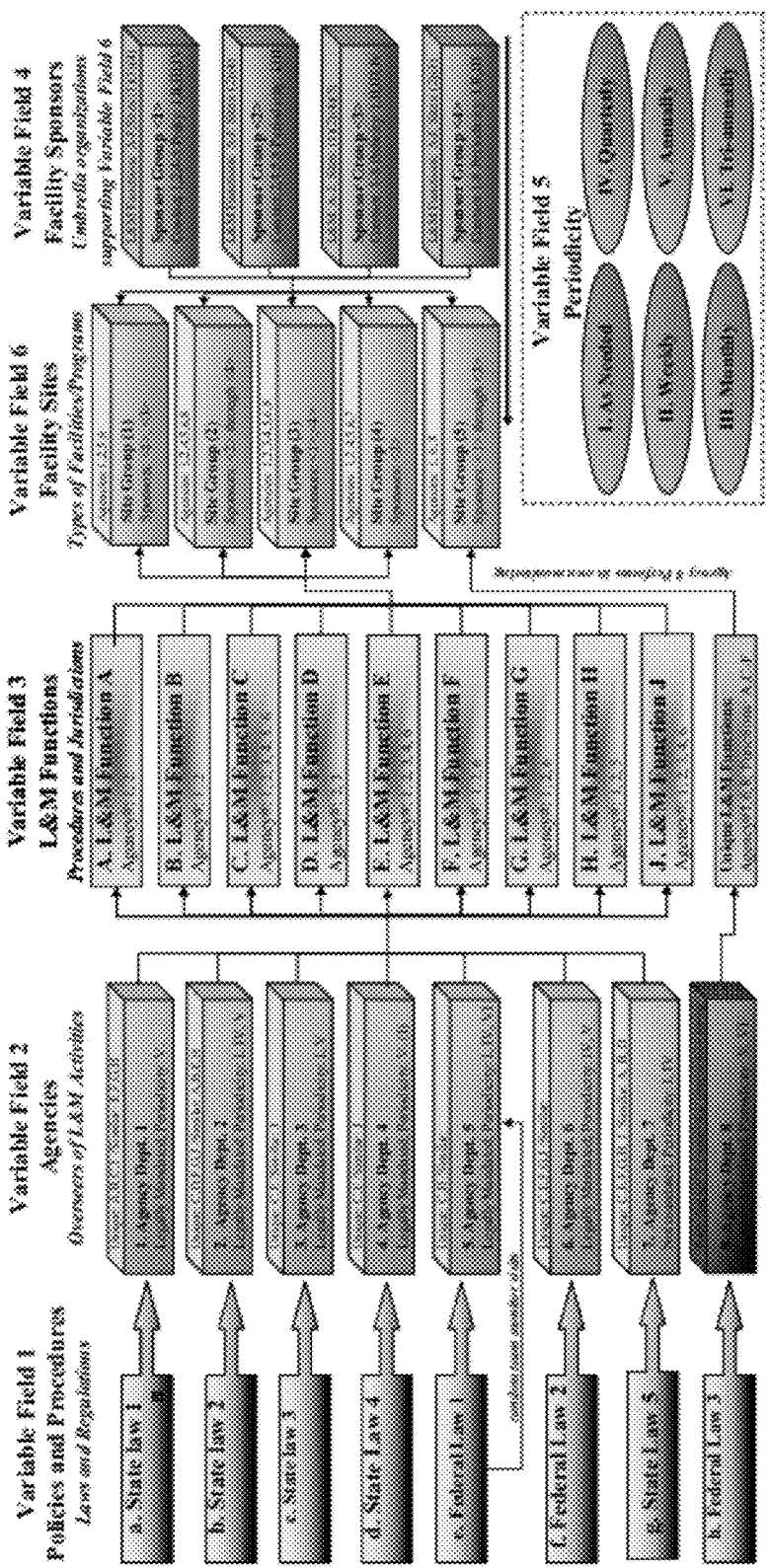
FIG. 6 shows a generic map of a facility licensing and monitoring system according to an exemplary embodiment of the present invention.
Figure 7:
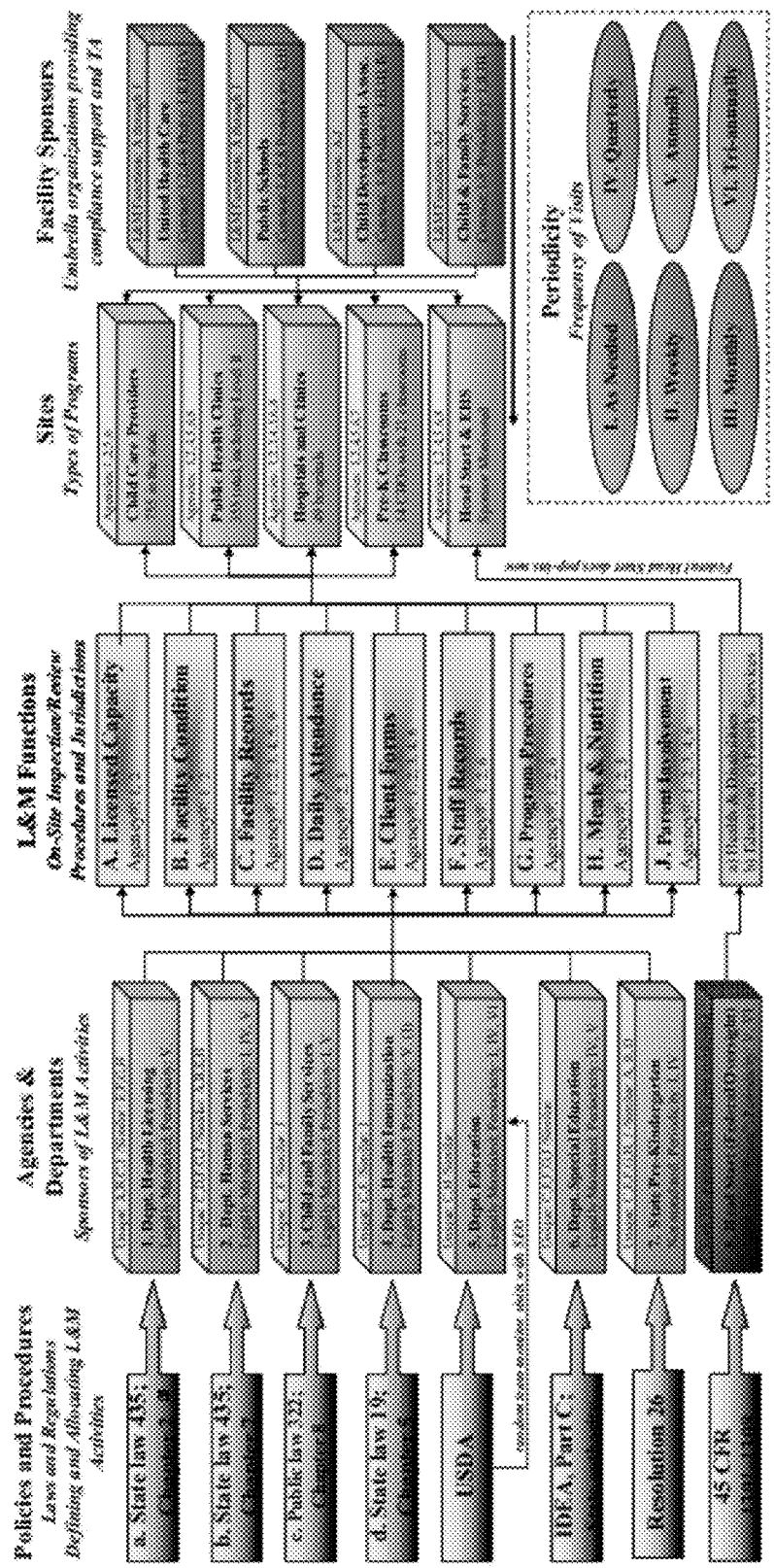
FIG. 7 provides a more specific example of a facility licensing and monitoring system as an extension of FIG. 6.

As stated above, in a given system map, such as the exemplary map shown in FIG. 2, various symbols may be used to enhance or supplement the information given. In both FIGS. 1 and 2 the * and + symbols connote that resources were not fully funded or operated system wide, respectively. While in both examples the qualifier is to note valuation of financial information and geographic area of impact, the present invention may be used for virtually any type of qualifier—populations served, services offered, evaluations performed, practices and methods incorporated, etc. In FIGS. 6 and 7, as examples, a qualifier is embedded within a variable field and serves to organize rather than comment upon the qualities of an object. In these examples in FIGS. 6 and 7, an analytical judgment was made regarding the "uniqueness" vs. the "similarity" of variable group functions for Licensing and Monitoring Facilities. This reorganization of code group objects allows for more dynamic comparisons to be made between objects and therefore provides users with a tool for aggregating and disaggregating information. As stated above, a key to the tool is the identification of the variable groups and the assignment of corresponding code groups and symbols that allow for a condensed communication of the flow between and among them.

In an example of how a tool may be constructed, FIG. 2 contains three boxes denoting each of the three types of funding sources (code group One above). Within each box of funding source types are listed specific funding streams, each with an Arabic numeral assigned. The first box is entitled "federal funding sources" and contains four distinct federal funding streams. The second box is entitled "State funding sources" and has three distinct state funding streams. The third box is entitled "Private funding sources" and has five distinct private-sector funding streams listed. The first box has Arabic numerals 1, 2, 3 and 4—one for each of the funding streams from the federal government—noting "children served" as a reference to the programmatic initiatives outlined in the "Who is Served?" variable field. Returning to the Funding Sources field, the second box has Arabic numerals 5, 6 and 7—again for each of the funding streams from the state government. The third box has Arabic numerals 8, 9, 10, 11 and 12—one for each of the five distinct private-sector sources of funding.

A second "variable group" is made up of institutional resources and organizations providing services. There are seven boxes listed vertically, each with the name of the organizational type that is classified using the "code group two" from above—capital letters. The first organizational type is given the letter "A" as its distinction. The second organizational type is given the letter "B" and so on through all seven—A, B, C, D, E, F and G.

A third variable group in FIG. 2 is identified as a distinct set of methods and practices, within the "How is Service Provided?" field, particular to the industry/field mapped by the invention. In this example there are four boxes, each containing a brief title of a practice and each practice is marked using the third code group listed above—Roman Numerals. The first box identifies a practice and gives it the number "I". A second practice is listed below in its own box and provided the number "II". In total, there are four boxes—I, II, III, and IV.

Each box identified in a given variable group on the page has space within it to allow for the numbers and letters of the other variable groups to be included in the box. In variable group one, the funding sources, each box (here containing Arabic numerals) has listed the capital letters that mark the second variable group (institutional resources) as well as the Roman numerals of the third variable group (Industry Practices) on its own listing. Taking the first box of variable group one—"Federal funding sources"—the capital letters are listed: A, D, and E. This means that the federal funding sources are being allocated to the institutional types listed in the second variable group that have the connotation A, D and E. Following on these capital letters are the Roman numerals I, III and IV. This connotes that the federal funding listed is supporting the "industry practices" of variable group three—I, III and IV—within the "How is Service Provided" variable field. Taken together, a large amount of information has quickly been condensed. A person viewing this first box will be able to follow the federal funds to the institutions and the practices they support.

In variable group two—the institutional resources—each of the boxes has a capital letter marking the different types of institutions particular to the system profiled by the invention. Each "institutional resource type"—marked by a capital letter—has its own box in which space is made available for containing the Arabic numerals of variable group one—the funding sources—as well as the Roman numerals from variable group three—the industry practices. Institutional type B, the second listed, contains the Arabic numerals 2, 4, 5, 9, and 12. This signifies that the types of organizations classified as being of institutional type B are receiving funds from federal sources 2 and 4, state government source 5, and private sources 9 and 12 as listed in variable group one. In addition, within the same box "B" there are listed Roman numerals II and III. This means that the organizational types classified as being type B are providing the methods and practices of type II and III as identified in variable group three—"industry practices." A person viewing this box will be able to quickly determine which of the funding streams are supporting the work of the institution and which industry practices and methods the institutional type identified is implementing.

In variable group three—the Industry Practices—each of the boxes has a Roman numeral marking the different types of practices and methods particular to the system profiled by the invention. Each is listed separately in its own box. There are four listed—I, II, III and IV. Within box III, for example, the name of the Industry Practice is joined by Arabic numerals 1, 3, 4, 7, 10, and 11. This connotes that Industry Practice type III is supported by funding from the federal government sources 1, 3, and 4; state funding source 7; and private sector funding sources 10 and 11—as listed in variable group one (funding sources). Also in box III are the capital letters A, C, D, E and G. This connotes that of the institutional resource types listed in variable group two, only A, C, D, E and G are organizations implementing industry practice III. A person viewing this box will quickly be able to determine what funding is supporting what industry practice and who is doing the implementation.

In combination with spreadsheets, databases and raw reports and other information, users can easily move through these materials to find the specific numbers—financial information, institutional capacity, number served, populations affected, etc.—that they need in order to make an informed decision or gain understanding of how the sub-systems and components of the larger system operate. As symbols and other distinct markers are used to identify different variable groups—that can be expanded or contracted based on the industry, how it functions, and the desired ends of the application of the invention—a dual phenomena is enabled. First, the functions of the entire system can be viewed and analyzed from a very broad and comprehensive standpoint. Second, that highly detailed and narrow queries can be pursued that track individual items of each of the variable groups listed.

As noted above with respect to FIG. 2, various themes and boxes, variables and systems may be considered using the teachings of the present invention. For each such system or organization or architecture, the individual components would necessarily be dependent on the specific topic being considered. Thus, the tool shown in FIG. 2 is merely exemplary of a hypothetical situation where users are interested in studying the relationship of various factors that contribute to a System for Early Childhood Development. However, what may be gleaned from this example is how the various boxes are drawn out to contribute to a given study of this hypothetical system.

During the process of applying the present invention to the Early Childhood Development System shown in FIG. 2, five service delivery themes were constructed. They are included here only as an example of how the invention provides clients with key "Organizing Principles" for managing their system of service delivery.

The health theme provides information relating programs and services that maximize the physical and mental well-being of children and the chances for them to grow up healthy and ready to learn. For example, such health services refer to those provided to pregnant women and the overall mental and physical development of each child through five years of age. Exemplary topics include pregnancy, nutrition, medical care, insurance, child well-being, special health and developmental needs, mental health, etc. In the "Who is Served?" section of this map, many eligibility-based programs are directly tied to economic or health needs and provide some measure of prevention, intervention and/or treatment services.

The safety theme relates to the question of whether children are living free of abuse, neglect, crime, drugs and other preventable circumstances that compromise their ability to pursue their full potential. Safety, while connected to health, may include such issues as child safety seats, environmental safety, as well as problems in the home such as domestic abuse, substance abuse (including prenatal concerns), neglect, and other forms of personal abuse. Within the continuum of services for families with children birth to five years of age, these activities address prevention, intervention and treatment of abuse and neglect, dangerous behavior and home environments, and other risk factors.

The early care and education theme relates to programs and services that provide opportunities for children to develop emotionally, socially, physically, cognitively and in other ways ready to succeed. Childcare, curriculum and non-curriculum-based early learning programs are at the heart of the child development system. These activities often cut across the other service themes noted in the system map (health, safety, parent involvement). One of the underlying goals of the consideration of this map is to ensure that children are healthy and ready to learn. A developmentally-based assistance category is an example of the early care and education continuum as it affects children with developmental delay.

The theme of parental involvement and skills relates to programs and services that involve parents in the development of their child, provide counseling, training, mentoring, information, resources and/or materials for successful parenting. Several programs include parental involvement and skill development as a central aspect of their approach—whether the program is focused on health, safety, or early care and education. Related topics include family stability, adoption, and family literacy. These issues are part of the condition for establishing and nurturing a healthy learning and family environment for children.

Finally, the economic security theme relates to children growing up in financially stable homes where basic needs can be met, through services such as social and emergency support, training and other means to achieve self-sufficiency. Of critical need are financial and social supports to families in lower income categories. The challenges of affordable housing, transportation, unemployment, and other factors often undermine a healthy and supportive environment for children. In the "Who is Served?" section children and families requiring and receiving economic security support services often fall in the Income-Based Assistance group of eligibility.

The above examples were given using a static diagram shown in FIG. 2. However, tools according to the present invention may be dynamic and updated in real time by linking information to various "live" sources that directly link any changes of information to the system map shown in the attached Figures.

Figure 4:
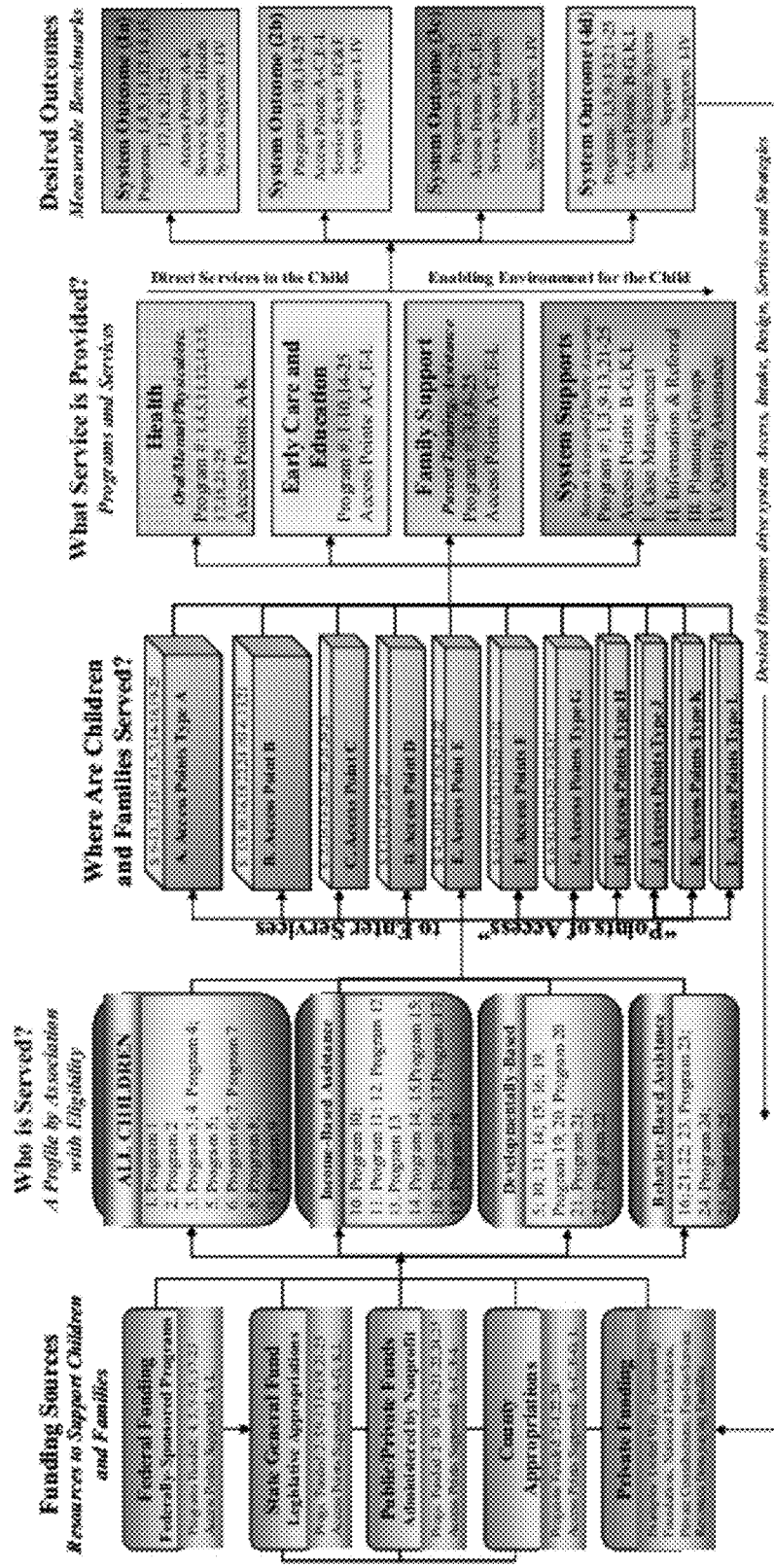
FIG. 4 shows a map for a specific county within a state's system of early childhood.
Figure 5:
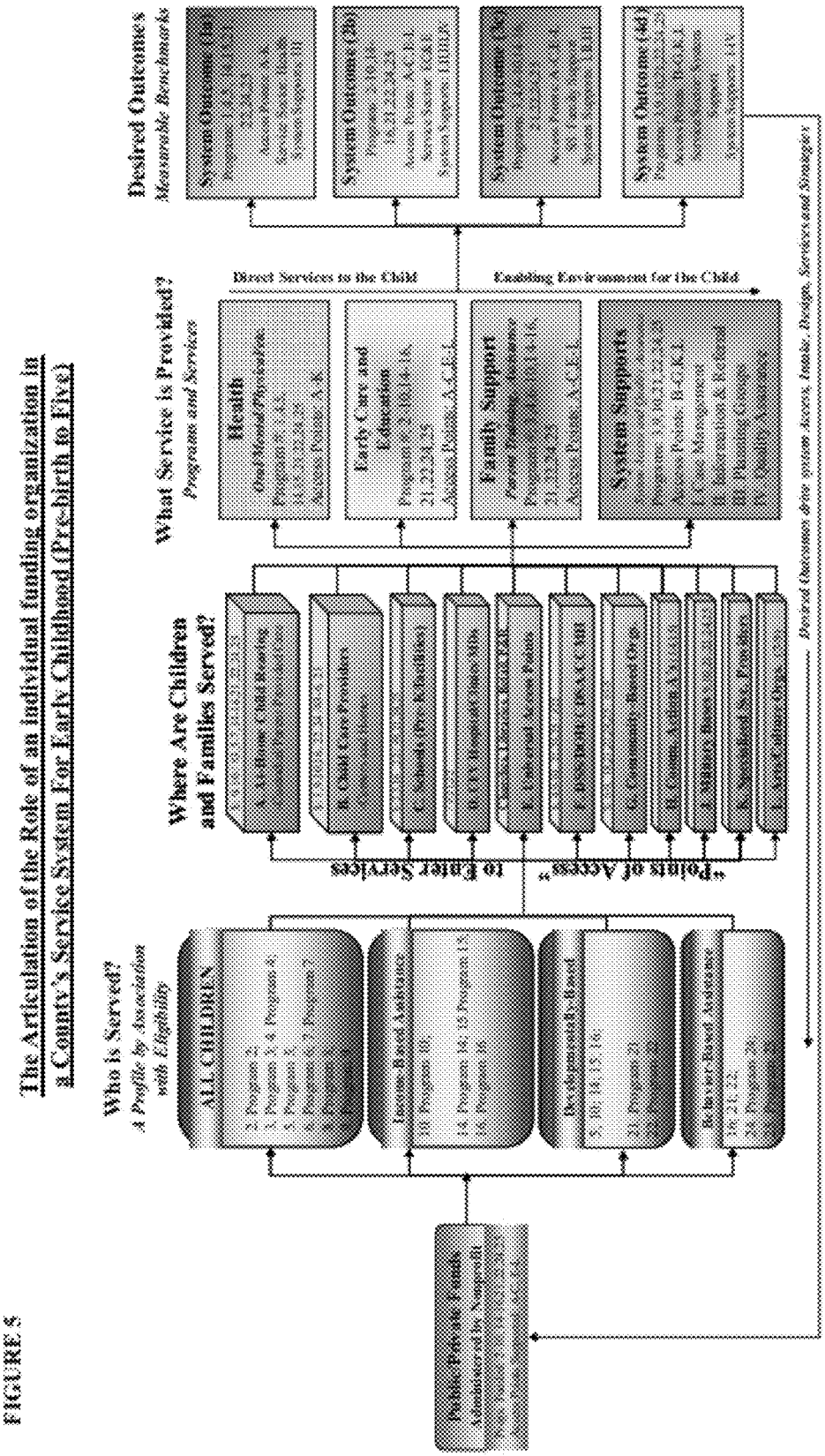
FIG. 5 shows a detail of FIG. 5 when one object is selected and highlighted and all its pathways and interdependencies within the system are revealed.

Continuing within the field of Child Development systems, FIGS. 4 and 5 provide additional examples of the invention when applied to a county within a state. In FIG. 4 a generic description of objects is provided—Program 1, Program 2, Access Point A, Access Point B, and so on. Using this example one can follow the funding sources through to the services they support and the institutional types that receive the funds and provide the services, just as in FIGS. 1, 2, and 3. In comparison with FIG. 1, neither FIG. 2 nor 4 contain every variable field specified. This variation demonstrates the flexibility of the invention in crafting an articulation of a system based on preferences set by users. For example, FIG. 2, which is specific to a childhood system, contains a "How is Service Provided" variable field while it does not contain a variable field connoting "Desired Outcomes" as does FIG. 4, which is also an early childhood system. In short, the invention is not "one size fits all."

FIG. 5 serves to illustrate a specific example of how the invention can be used to specify and isolate variables and objects from others within the system. In FIG. 5 a single funding source, the "Public/Private Funds Administered by a Nonprofit Organization" is profiled as if a user simply used a mouse to click on the hyperlink of the object to reveal all the ways in which the funding source makes an impact on the system of early childhood in the county.

As the above exemplary embodiments illustrate, one of the most powerful advantages of the present invention is its flexibility to be applicable to a wide range of problems, issues, systems and institutions. Furthermore, each of the particular variables and each qualifier within the variable may be presented to a user on a single interactive computer screen. For example, each of FIGS. 1-10 may be a computer page, developed by the use of multiple connections to multiple databases that provide real time data output to the computer page. A server may be programmed to interact with all such databases to gather information from each and present it in the predetermined architecture according to the present invention. If a user clicks on a particular variable or qualifier, further information is immediately presented to the user regarding that particular variable or qualifier. Furthermore, such information may be uploaded to the databases using standard landline or wireless connections to provide real time information to the system variables page as shown in FIGS. 1-10.

Countless other examples are available to show the tremendous flexibility of the present invention. Reference will be made in brief to a few more examples without discussing each of the variables and qualifiers in depth. It is apparent to one having ordinary skill in the art that each such system figure will have its own unique set of variables and qualifiers, depending on the desires of the user who constructs the system map.

FIGS. 6 and 7 present more generic and more specific system maps, respectively, of a facility licensing and monitoring system and the particular variables, objects and qualifiers that are relevant to such a system map consideration. Such facilities could include ones for health care, elderly care, mental hospitals, etc. The system map may be read in a similar fashion as those described above.

Figure 8:
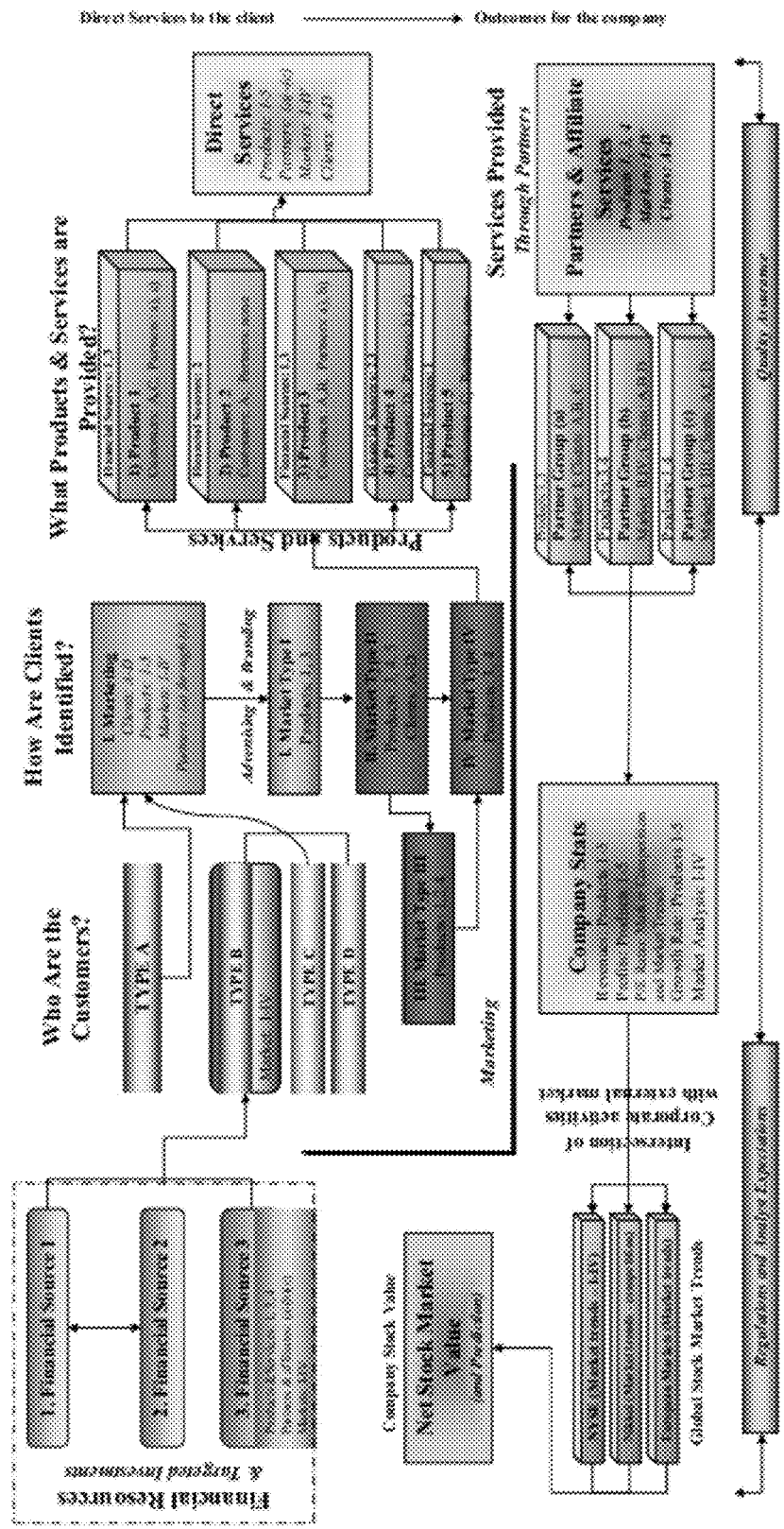
FIG. 8 shows an exemplary embodiment of the present invention applied in the valuation of stock.

In yet another non-limiting example of a dynamic tool according to the present invention is the continuous valuation of a given stock according to changes in economic and environmental factors that influence the value of the stock, as shown in FIG. 8. The particular variables and factors that influence the valuation of a particular stock are shown in system detail. This system map would be tremendously helpful to a stock broker, accountant or trader for whom the real time value of a particular stock may have tremendous value. Such user would enter the various factors that influence the valuation of the stock and link each such factor with a database that provides real time information regarding that factor. Thus, after the initial set up, the user would have a valuable real time tool to determine the valuation of a stock without having to resort to searching numerous variables manually. It could be done automatically and in real time or, alternatively, at the end of the day or other similarly pre-determined period.

Figure 9:
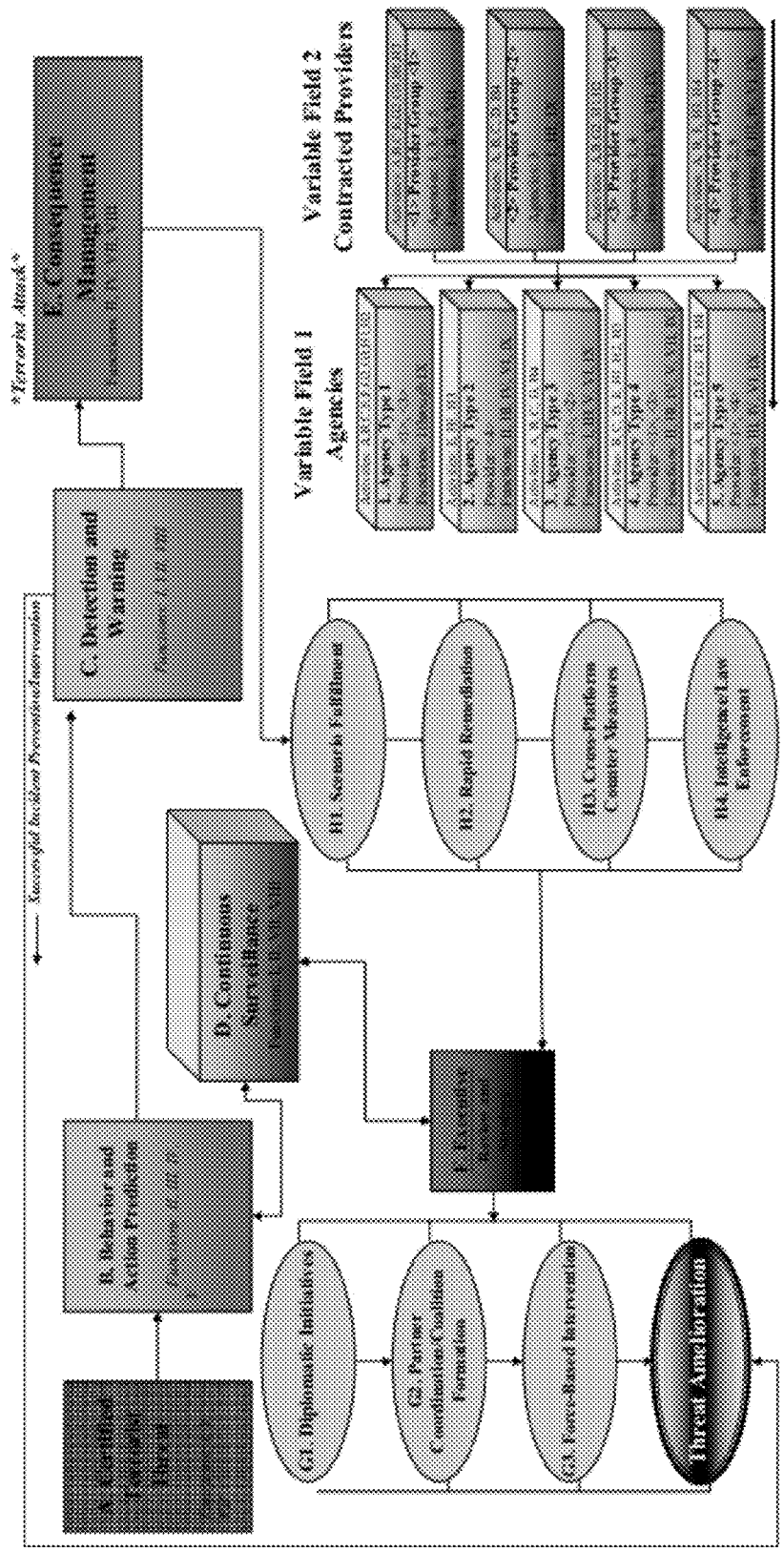
FIG. 9 shows an exemplary embodiment of the present invention applied in the field of homeland security and counter-terrorism.

Similarly in concept, a system map for homeland security and counter-terrorism, as shown in FIG. 9, would be very helpful for law enforcement administration to monitor and control the tremendous volume of information that is flowing in various variables throughout the world. Such a system map would provide an organized methodology to maintain homeland security system information and control of variables that determine such system.

Figure 10:
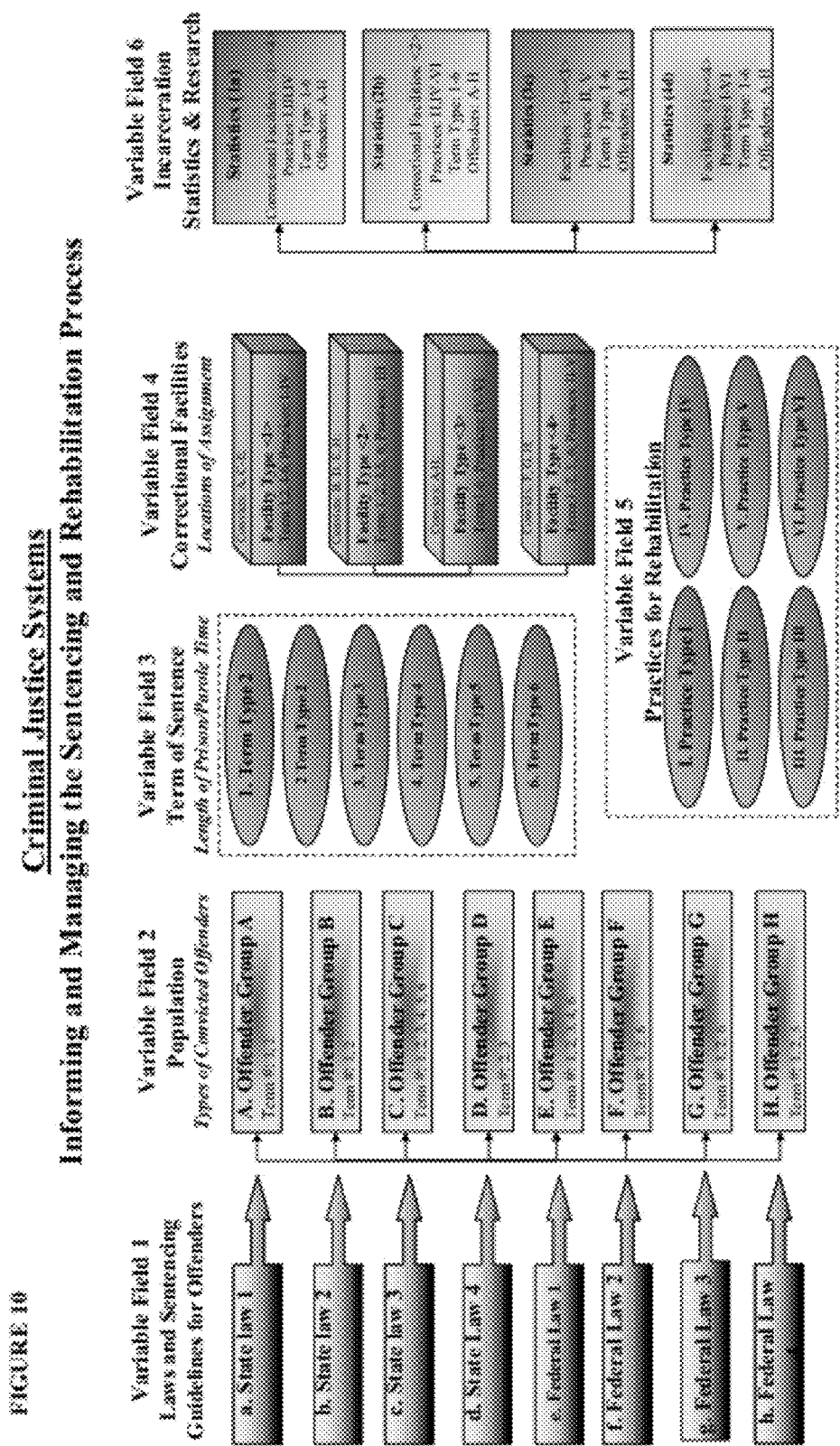
FIG. 10 shows an exemplary embodiment of the present invention applied in the criminal justice system.

Finally, yet another exemplary embodiment of the present invention, as shown in FIG. 10, is its use in the criminal justice system to determine how the flows of particular laws interact with particular sentences, various correctional facilities and further incarceration and rehabilitation statistics. Such system map would determine which variables are most influential in the control of criminal behavior and which variables interact more or less strongly with other variables. The use of such a system would be beneficial worldwide.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for presenting a quantity of information, the system comprising:
 a computer which produces a map of a plurality of variable fields, the plurality of variable fields including a resource field including at least one resource type, a client field including at least one client type, and an access point field including at least one access point type, each variable field having a field identifier, each type within each variable field having a type identifier related to the field identifier, the map having a theme relating to an overall concept, the computer aggregating each type of the plurality of variable fields such that the at least one resource type, the resource field including a first symbol to connote that the resource field is not operated across each of the plurality of variable fields, contains a funding source relating to at least one type outside of the resource field, including the client field including a second symbol to connote that the client field is not fully funded and the access point field including a numeral for each variable field funding the access point field, that has a relationship with the at least one resource type, the map including the type identifiers of each other type in each other variable field;
 wherein each type of the plurality of variable fields is linked to an external source of information that changes a value of the respective type in real time, thereby affecting each value of each type of the plurality of variable fields that relates to the respective type; and
 wherein the value in each type of the plurality of variable fields is continuously updated in real time.

2. The system of claim 1, wherein the plurality of fields further includes a practice method field including at least one practice method type.

3. The system of claim 1, wherein the plurality of fields further includes a service sector field including at least one service sector type.

4. The system of claim 1, wherein the plurality of fields further includes a system support field including at least one system support type.

5. The system of claim 1, further comprising at least one directional line between two of the plurality of types that displays the direction of a flow between the two types.

6. The system of claim 1, wherein the concept relates to early childhood development.

7. The system of claim 1, wherein the concept relates to a facility licensing and monitoring system.

8. The system of claim 1, wherein the concept relates to stock valuation.

9. The system of claim 1, wherein the concept relates to homeland security.

10. The system of claim 1, wherein the concept relates to criminal justice.

11. A method for presenting a quantity of information at once on a single page, the method comprising:
- determining a plurality of variables that contribute to at least one resource type, at least one client type, at least one access point type;
- organizing the variables in a plurality of variable fields, the plurality of variable fields including a resource field including the at least one resource type, a client field including the at least one client type, and an access point field including the at least one access point type, each variable field including a field identifier;
- presenting each variable in a map, each variable having a type identifier related to the field identifier;
- identifying each other variable relative to a given variable by providing information relating to the relative variables, including the resource field, the resource field including a first symbol to connote that the resource field is not operated across each of the plurality of variable fields and a funding source relating to at least one type outside the variable field, the client field including a second symbol to connote that the client field is not fully funded, and an access point field including a numeral for each resource field funding the access point field, the map including the type identifiers of each other variable in each other variable field; and
- linking each variable within the plurality of variable fields with an external source of information that changes a value of the respective variable in real time;
- wherein the value of each variable in the plurality of variable fields is continuously updated in real time.

12. The method of claim 11, further comprising gathering information relating to the plurality of variables.

13. The method of claim 11, further comprising recalculating the value of each variable that includes the type identifier upon a change in value of the respective variable.

14. The method of claim 11, further comprising updating the external source of information.

15. The method of claim 11, further comprising displaying the map on a computer.

16. A method for presenting a quantity of information on a dynamic map, the method comprising:
- determining a plurality of variables that contribute to at least one resource type, at least one client type, at least one access point type;
- presenting each variable in a map;
- classifying each variable field with a field identifier, each variable having a type identifier related to the respective field identifier;
- presenting each other variable relative to a given variable by providing information relating to the relative variables, including a resource field, the resource field including a first symbol to connote that the resource field is not operated across each of the plurality of variable fields and a funding source relating to at least one type outside the variable field, a client field including a second symbol to connote that the client field is not fully funded, and an access point field including a numeral for each resource field funding the access point field;
- linking each variable within the plurality of variable fields with an external source of information that changes a value of the respective variable in real time, thereby affecting each value of each variable of the plurality of variable fields that relates to the respective variable; and
- wherein the value of each variable of the plurality of variable fields is continuously updated in real time.

17. The method of claim 16, further comprising gathering information relating to the plurality of variables.

18. The method of claim 16, further comprising recalculating the value of each variable that includes the type identifier upon a change in value of the respective variable.

19. The method of claim 16, further comprising updating the external source of information.

20. The method of claim 16, further comprising displaying the map on a computer.

* * * * *